United States Patent [19]

Cooper Jr. et al.

[11] Patent Number: 4,774,752
[45] Date of Patent: Oct. 4, 1988

[54] FUEL ASSEMBLY REPAIR SYSTEM AND METHOD

[75] Inventors: Frank W. Cooper Jr., Monroeville; Alan Savinell, Penn Hills, both of Pa.

[73] Assignee: Westinghouse Electric Corp., Pittsburgh, Pa.

[21] Appl. No.: 879,668

[22] Filed: Jun. 27, 1986

[51] Int. Cl.$^4$ .............................................. B23P 19/04
[52] U.S. Cl. .................................... 29/426.4; 29/723; 376/261
[58] Field of Search .................... 29/426.4, 722, 723, 29/291, 426.1, 33 K, 33 R, 726, DIG. 56; 376/261; 51/37, 241 S; 409/175, 143, 134, 135; 408/72, 79, 241 G, 710, 56; 407/119

[56] References Cited

U.S. PATENT DOCUMENTS

| | | | |
|---|---|---|---|
| 3,286,553 | 11/1966 | Spencer et al. | 408/79 |
| 3,553,905 | 1/1971 | Lemelson | 407/119 X |
| 3,617,142 | 11/1971 | De Wane | 409/175 X |
| 4,522,494 | 11/1985 | Wix | 408/241 G X |
| 4,594,774 | 6/1986 | Barker et al. | 29/723 |
| 4,638,543 | 1/1987 | Shallenberger et al. | 29/723 X |
| 4,646,414 | 3/1987 | Wilson et al. | 29/426.4 |
| 4,664,394 | 5/1987 | Theissig et al. | 408/241 G X |
| 4,696,102 | 9/1987 | Overbay | 29/726 |

FOREIGN PATENT DOCUMENTS

| | | | |
|---|---|---|---|
| 932794 | 7/1963 | United Kingdom | 29/723 |
| 1335332 | 10/1973 | United Kingdom | 29/723 |
| 2060238 | 10/1979 | United Kingdom | 29/723 |
| 2084542 | 4/1982 | United Kingdom | 29/723 |

OTHER PUBLICATIONS

"The Impact of Metallic Debris on Fuel Rod Performance," by Kilp and Iyengar, Dated 1985.
Copending Serial No. 916,683 Filed Oct. 8, 1986, by Ralph Tolino, Entitled "Grinding Tool and Screw Installation Plate for Use in a Fuel Assembly and Repair and Reconstitution System", (Now an Issued U.S. Patent).

Primary Examiner—Carl E. Hall
Assistant Examiner—Joseph M. Gorski

[57] ABSTRACT

A tooling system and method for remotely removing a rod or other component located between the top and bottom nozzles of a fuel rod assembly is disclosed herein. Generally, the tooling system comprises a grinding mechanism including a carbide burr and a high speed air motor for grinding an opening through the adapter plate of the top nozzle of a size sufficient to allow the withdrawal of said component therethrough, a housing fixture connected to the carbide burr of the grinding mechanism for positioning the burr over a point in the adapter plate adjacent to the component to be removed, and an engagement assembly connected to the grinding mechanism for moving the carbide burr into grinding engagement with the adapter plate, and a gripping apparatus insertable through the hole produced by the grinding mechanism for gripping the rod or other component and withdrawing it through the opening. The use of a high-speed air motor in combination with a carbide burr provides a hole in the adapter plate large enough to remove a selected rod from the fuel rod assembly while producing a particulate debris which is, at the most, only about 20 mils in diameter. Unlike the shavings and slivers produced by prior art tooling systems utilizing drill bits, the fine grindings produced by the invention will not lodge themselves within the grids of the fuel rod assemblies and degrade the walls of the fuel rods by a fretting action.

24 Claims, 6 Drawing Sheets

FUEL ASSEMBLY REPAIR SYSTEM AND METHOD

BACKGROUND OF THE INVENTION

1. Field of the Invention

This invention relates to a tooling system and method for repairing an irradiated fuel assembly wherein an instrument tube, fuel rod or other component must be removed. It is capable of removing such a component without the need for taking the fuel assembly apart.

2. Description of the Prior Art

Systems for removing components from irradiated fuel assemblies are known in the prior art. An example of such a system is described in U.S. patent application Ser. No. 746,897 filed June 20, 1985, by Anoop Kapoor et al. and assigned to the Westinghouse Electric Corporation. Generally, this application discloses a remote repair system for a nuclear fuel rod assembly that is capable of selectively withdrawing or inserting a fuel rod into or out of the lateral support grids of the assembly. However, before this particular system may be utilized, the top nozzle of the irradiated fuel rod must be removed from the rest of the assembly. This is accomplished by inserting an internal-diameter cutter into the open ends of the thimble tubes which connect the top and bottom nozzles together, and cutting these tubes from the inside at a point just beneath the top nozzle of the fuel rod assembly.

Unfortunately, the remote removal, storage, and reinstallation of a top nozzle assembly onto an irradiated nuclear fuel rod assembly requires the use of an expensive and sophisticated tooling system, and may only be successfully accomplished with the expenditure of a significant amount of time and effort. While such time and effort may be completely justified in a case where components are to be removed or installed, such time and effort is difficult to justify in a case where only one component in a fuel rod assembly is involved. One proposed solution to the problem of removing or installing a single component from a fuel rod assembly has been the use of a device that operates like a remote drill press and bores a hole in the top nozzle over the particular component involved to provide access thereto by means a gripping device. However, such a single-component removal system generates relatively large pieces of metallic debris and shavings which can become lodged in the spaces between the rods and the spacing grids that surround them, ultimately causing them to break through a fretting action. But before one can fully understand exactly how such metallic debris can cause these rods to weaken and break, some brief background as to the structure, operation and environment of such fuel rod assemblies is necessary.

Nuclear fuel rod assemblies generally comprise 200 to 290 fuel rods mounted in a square array within a support skeleton. The support skeleton in turn is formed from the aforementioned bottom and top nozzle assemblies which are connected to one another by twenty-four circularly arrayed thimble tubes. The bottom and top nozzles are about eight to nine inches square, and the thimble tubes are about thirteen feet long, so that the overall shape of the fuel assembly is that of an elongated, rectangular prism (see FIG. 1A). The fuel rods themselves are about twelve feet long. In order to equidistantly space the long and relatively flimsy fuel rods within the support skeleton, the skeleton includes approximately seven grids, each of which has a square array of apertures for receiving and spacing the fuel rods. The grids are usually sheet-metal structures fabricated from a heat-treated, high strength stainless steel in an "egg carton" configuration that lends compressive strength to the grids with a minimum amount of weight.

In operation, after an array of nuclear fuel rod assemblies has been placed in the reactor core and irradiated, a jet of pressurized water is guided through the bottom nozzles thereof in order to uniformly absorb the heat generated by the rods. In nuclear reactors of the type designed by the Westinghouse Electric Corporation, the velocity of the pressurized water forced through the bottom nozzles of the fuel structures is on the order of fifteen feet per second. In some nuclear cores, this fifteen feet per second flow of water has created pressure differentials which in turn have resulted in side currents that flow laterally through the fuel rod assemblies disposed in the core. These side currents sometimes produce vibrations in the fuel rods. If sharp-edged, large particles of metallic debris fall and accumulate in the spaces between the rods and the cells defined by the grids of the fuel rod assemblies, this metallic debris can scour, puncture and eventually break the walls of the fuel rods as they laterally vibrate within the cells of the grids.

While the problems created by such metallic debris could perhaps be obviated by the provision of a suction means around the drill bit which could remove the particles as they are created by a vacuum-type action, the provision of such suction devices is expensive and cumbersome. Clearly, what is needed is a tooling system capable of providing an aperture in the adapter plate without the production of metallic chips, particles and other debris which can lodge in the spaces between the grid cells and the rods and ultimately cause the rods to break due to the fretting of the rods against the particles. Ideally, such a system should be remotely operable since irradiated fuel assemblies create an intensely radioactive environment, but also simple, reliable, and relatively inexpensive.

SUMMARY OF THE INVENTION

Generally speaking, the invention is both an apparatus and a method for repairing a fuel rod assembly which comprises a grinding mechanism for grinding a hole through the adapter plate of the top nozzle, a housing fixture that is detachably mountable over the top nozzle for positioning the grinding mechanism, and engagement means for engaging the grinding mechanism against the adapter plate, and a gripping means for withdrawing a selected rod or component through the hole in the adapter plate produced by the grinding mechanism. Unlike prior art systems which utilize a drill bit or machining head which produces relatively large pieces of metallic debris, the grinding mechanism of the invention provides a hole in the adapter plate large enough to allow the removal of a selected rod or component while producing metallic particles which are, at a maximum, only about 20 mils in diameter.

Preferably, the grinding mechanism is formed from a carbide burr and a high-speed air motor capable of operating at at least 15,000 rpm, and preferably at about 25,000 rpm. Additionally, the carbide burr is tapered or conical to facilitate the penetration and guidance of the burr completely through the adapter plate.

The housing fixture may include a means for detachably connecting the fixture from the fuel assembly that includes two expandable plugs that are receivable within and expandable against pre-existing openings in the top nozzle, such as the S-holes which are typically present in the crown of such nozzles. The housing means may also be formed from a locking plate, a cylindrical wall that is attached to the bottom surface of the plate, and a guide bushing that is attached to the top surface of the plate. The cylindrical wall may be used to properly position the housing fixture over the adapter plate of the top nozzle, and the guide bushing may be used to guide the engagement means of the tooling system.

The engagement means of the invention may include a tubular mast member that is slidably mounted within the guide bushing of the housing fixture. At its bottom end, the tubular mast may have a guide plate that is sealingly mounted around the distal end of the tubular mast through a gasket. This guide plate may include a high speed bearing for journaling the burr of the grinding means, as well as a gasket that circumscribes this aperture for preventing water from entering the interior of the tubular mast. At its top end, the tubular mast may have a lanyard to facilitate the manual raising and lowering of the carbide burr both toward and away from the adapter plate of the top nozzle.

In an alternative embodiment, the locking plate of the housing fixture may include a plurality of bearings, at least one of which is capable of rotatably mounting the carbide burr of the grinding means at an off-center point over the adapter plate that is adjacent to the component to be removed. In this embodiment, the mast member of the engagement assembly is not slidably connected to the housing fixture. Rather, while the mast member still houses the motor of the grinding mechanism, the shaft of the motor and the shank of the carbide burr are detachably connectable by means of a simple socket coupling.

The gripping means of the invention may include a radially expandable member that is remotely operable by means of an expanding member connected to a rod. In the preferred embodiment, the expandable member is a collet formed from heat-treated stainless steel. When a nut-like member draws the rod of the gripping means upwardly, the expanding member is pulled into the collet, which in turn causes it to radially expand against the inner walls of whatever structure the collet has been inserted into.

In the method of the invention, the housing fixture is detachably mounted over the adapter plate of the nozzle assembly by means of the expandable plugs, and the grinding mechanism is then used to grind a hole through the adapter plate which is sufficiently large to insert the gripping means through, and to withdraw the selected tube or other component from the interior of the fuel rod assembly. The housing fixture is then removed from the top nozzle, and a gripping means as heretofore described is inserted through the hole in order to grip and withdraw the selected rod or component.

In both the apparatus and the method, the combination of a high-speed motor and a carbide burr produces a hole in the adapter plate of a top nozzle that is large enough to remove a selected rod or other component without the production of metallic debris that can be become lodged in the grids of the fuel rod assembly and damage the walls of the fuel rods by fretting.

BRIEF DESCRIPTION OF THE SEVERAL FIGURES

FIG. 1A is a perspective view of a fuel rod assembly that the repair system and method of the invention is applicable to;

DETAILED DESCRIPTION OF THE PREFERRED EMBODIMENT

General Overview of the Structure and Operation of the Invention

Figure 1A:
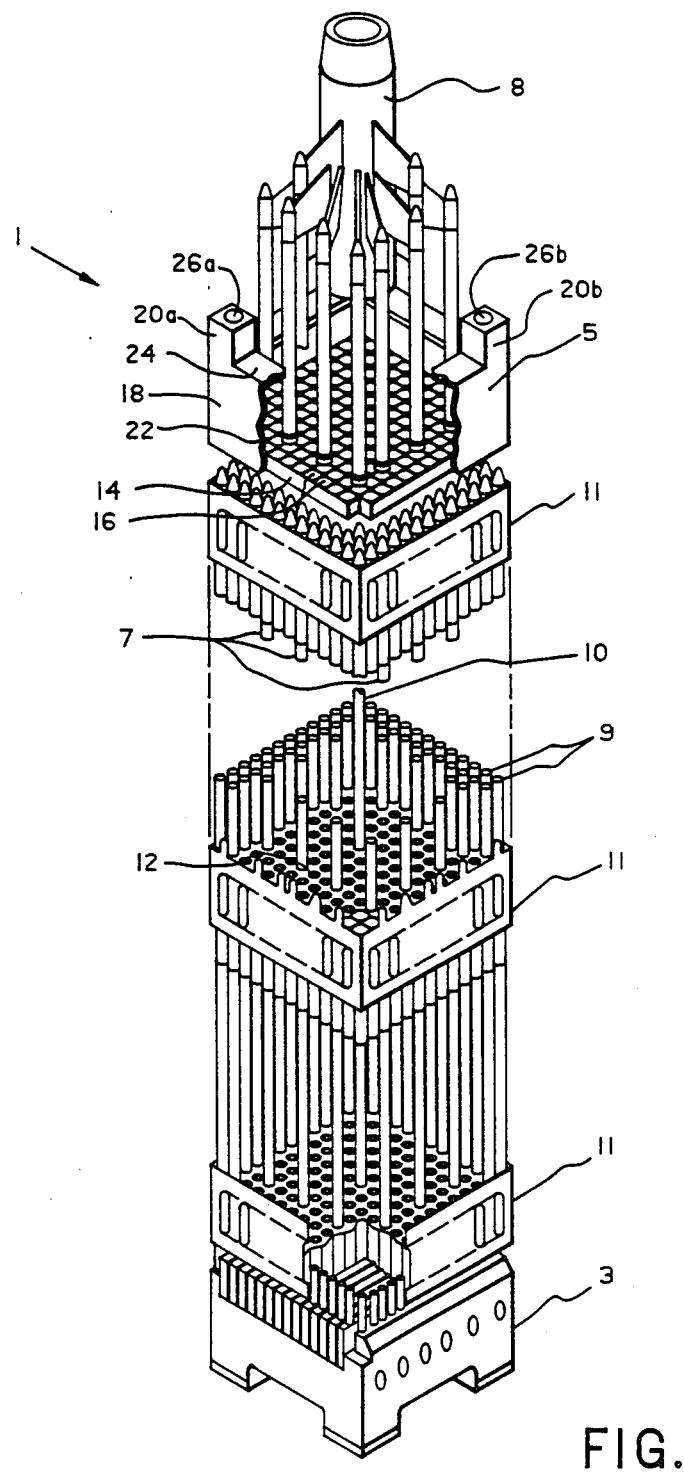
Figure 1B:
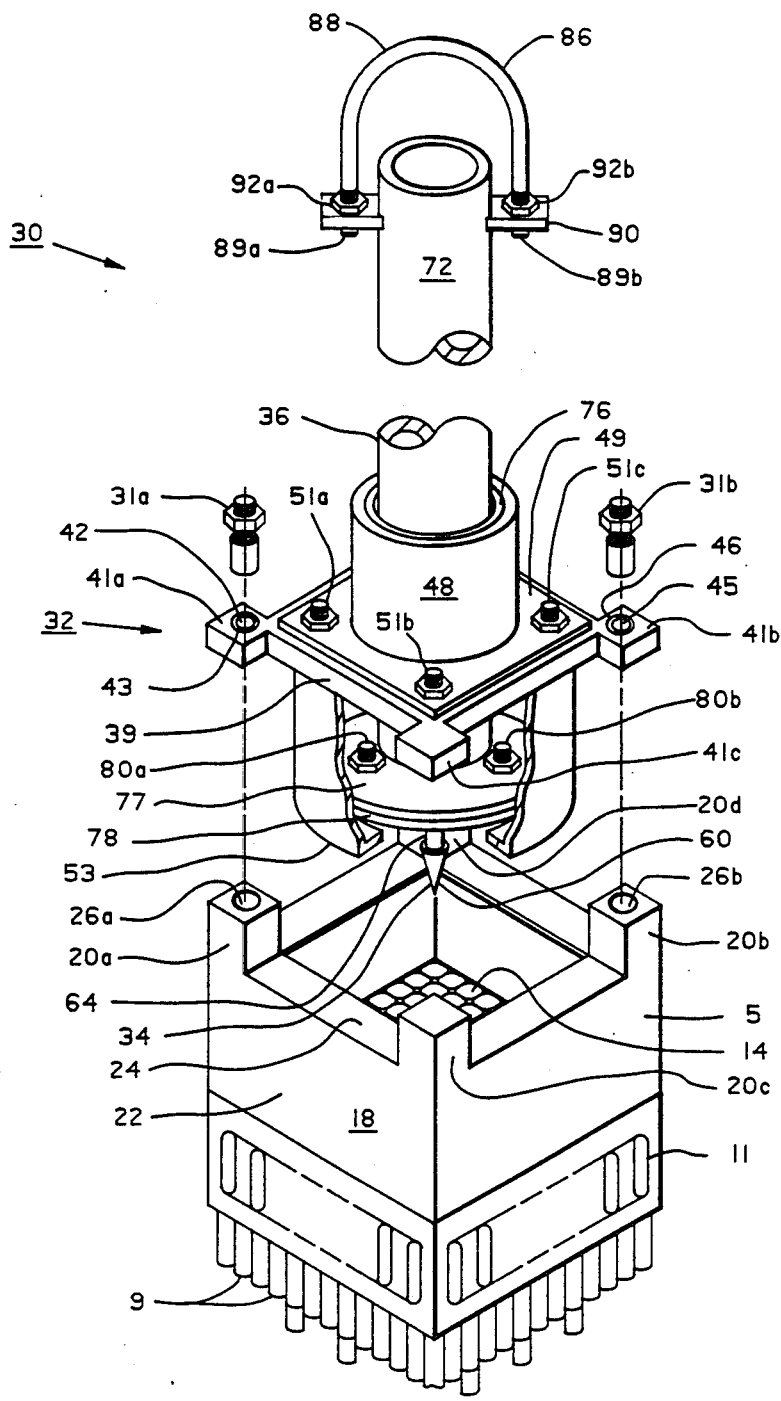
FIG. 1B is a perspective, partially exploded view of the housing fixture, grinding mechanism, and engagement assembly of the tooling system of the invention.

With reference to FIGS. 1A and 1B, wherein like numerals designate like parts throughout all the several figures, the instant invention is particularly useful in repairing or replacing component parts of a fuel rod assembly 1. Such fuel rod assemblies generally comprise a bottom nozzle 3 and a top nozzle 5 which are interconnected by means of a generally circular array of thimble tubes 7 which form a frame for the assembly. A control rod assembly 8 is slidably mounted within the frame formed by the thimble tubes 7. A plurality of fuel rods 9 are captured between the bottom nozzle 3 and the top nozzle 5. An instrument tube 10 may be centrally located within the array of fuel rods 9 in order to monitor the temperature and overall performance of the fuel rods 9 when the fuel rod assembly 1 is on line. The fuel rods 9 are laterally spaced from one another by seven regularly spaced grids 11 (only three of which are shown). Generally speaking, these grids are "egg crate" sheet metal structures, each of which includes a square array of rod-receiving apertures 12. The rod-receiving apertures 12 of each of the grids 11 are mutually alignable with one another when the grids are properly affixed to the thimble tubes 7.

The top nozzle 5 of the fuel rod assembly 1 generally includes an adapter plate 14 at its lower end that has a plurality of apertures 16 for conducting a flow of heated water out of the assembly 1. The adapter plate 14 is surrounded by a box-like crown 18 having four support columns 20a, 20b, 20c and 20d at each of its corners. These support columns 20a–20d are mutually interconnected by rectangular wall members 22. The upper end of each of these wall members 22 terminates in an L-shaped flange 24 as shown which provides additional strength to the box-like crown 18. In order to provide a "handle" for manipulating the fuel rod assembly 1, holes 26a, 26b are provided in the two catty-cornered support columns 20a, 20b as shown. In the trade, holes 26a, 26b are known as S-holes. Such holes are present on the vast majority of all fuel rod assemblies now in existence.

The tooling system 30 illustrated in FIG. 1B is conveniently mountable over the upper end of a top nozzle 5 by means of expandable plugs 31a, 31b that are insertable within and engageable against the S-holes 26a, 26b. However, before a detailed description is given as to the manner in which the tooling system 30 is mounted over the top nozzle 5, a brief description of the principal components of this system will be given.

Figures 4, 5:
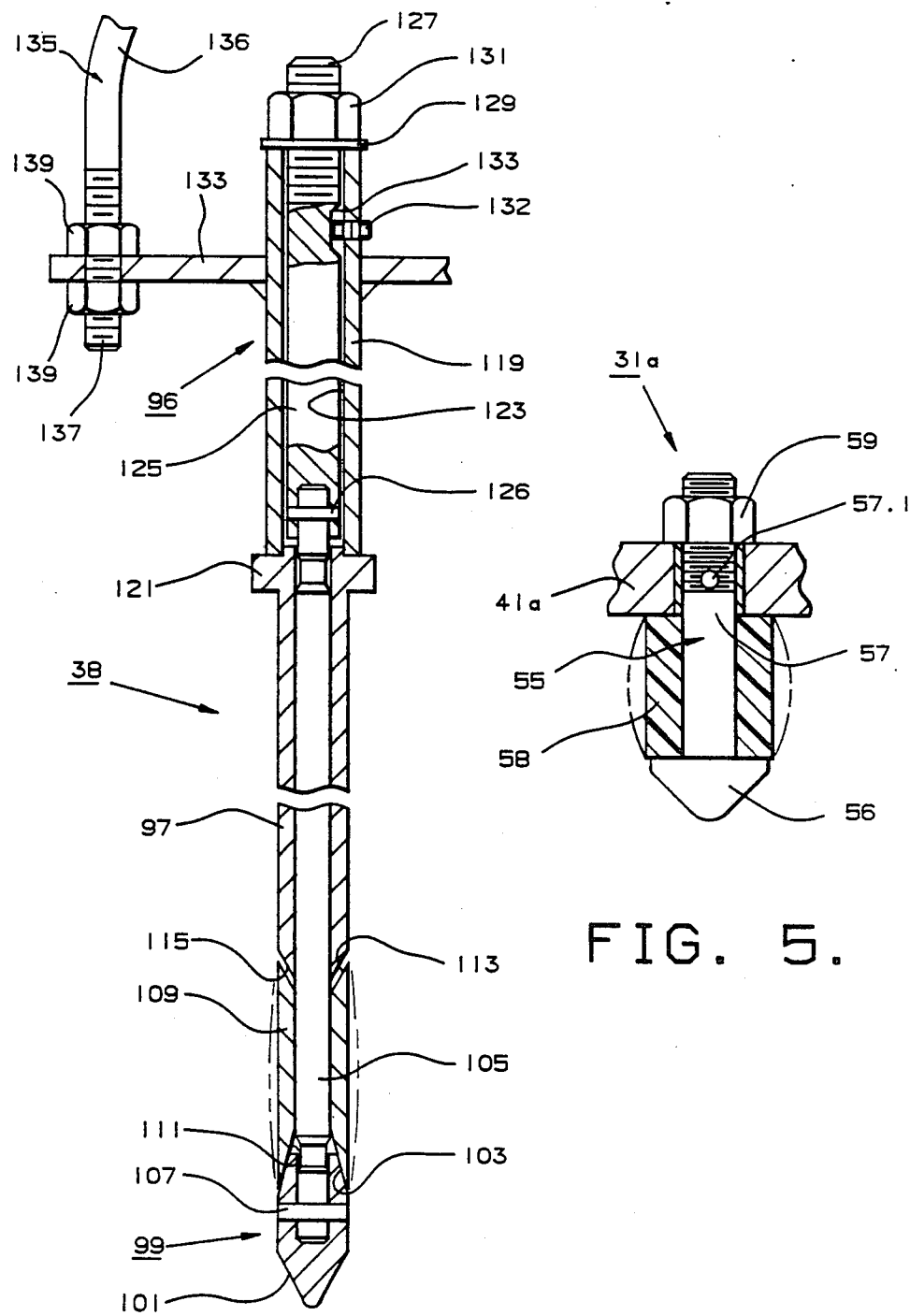
FIG. 4 is a cross-sectional side view of the component gripper of the tooling system of the invention.
FIG. 5 is a cross-sectional side view of one of the expandable plugs used to secure the locking plate of the housing fixture onto the top nozzle of a fuel rod assembly.

With reference now to FIGS. 1B and 4, the tooling system 30 of the invention generally includes a housing fixture 32, a grinding mechanism 34 for grinding a hole for the adapter plate 14, an engagement assembly 36 that is connected to both the housing fixture 32 and the grinding mechanism 34 for moving the grinding mechanism 34 against an adapter plate 14, and a component gripper 38 for gripping a selected component (such as instrument tube 10) and withdrawing this component through the bore produced by the grinding mechanism 34. In operation, the control rod assembly 8 of the assembly 1 is removed by merely pulling it upwardly so that it slides out of the frame of the assembly 1. Next, the housing fixture 32, grinding mechanism 34, and engagement assembly 36 of the tooling system 30 are detachably mounted into the S-holes 26a, 26b of catercornered columns 20a, 20b by means of the previously mentioned expandable plugs 31a, 31b. The grinding mechanism 34 is then actuated, and remotely manipulated against the adapter plate 14 by means of the engagement assembly 36 until a bore is ground through the adapter plate 14. The expandable plugs 31a, 31b are then retracted from engagement against the S-holes 26a, 26b, and the housing fixture 32, grinding mechanism 34, and engagement assembly 36 are lifted off from the upper end of the top nozzle 5. Finally, the component gripper 38 shown in FIG. 5 is extended through the bore produced by the grinding mechanism 38 in order to grip and withdrawn the instrument tube 10 or other selected component out of the fuel assembly 1.

Specific Description of the Tooling System and Method of the Invention

Figure 2:
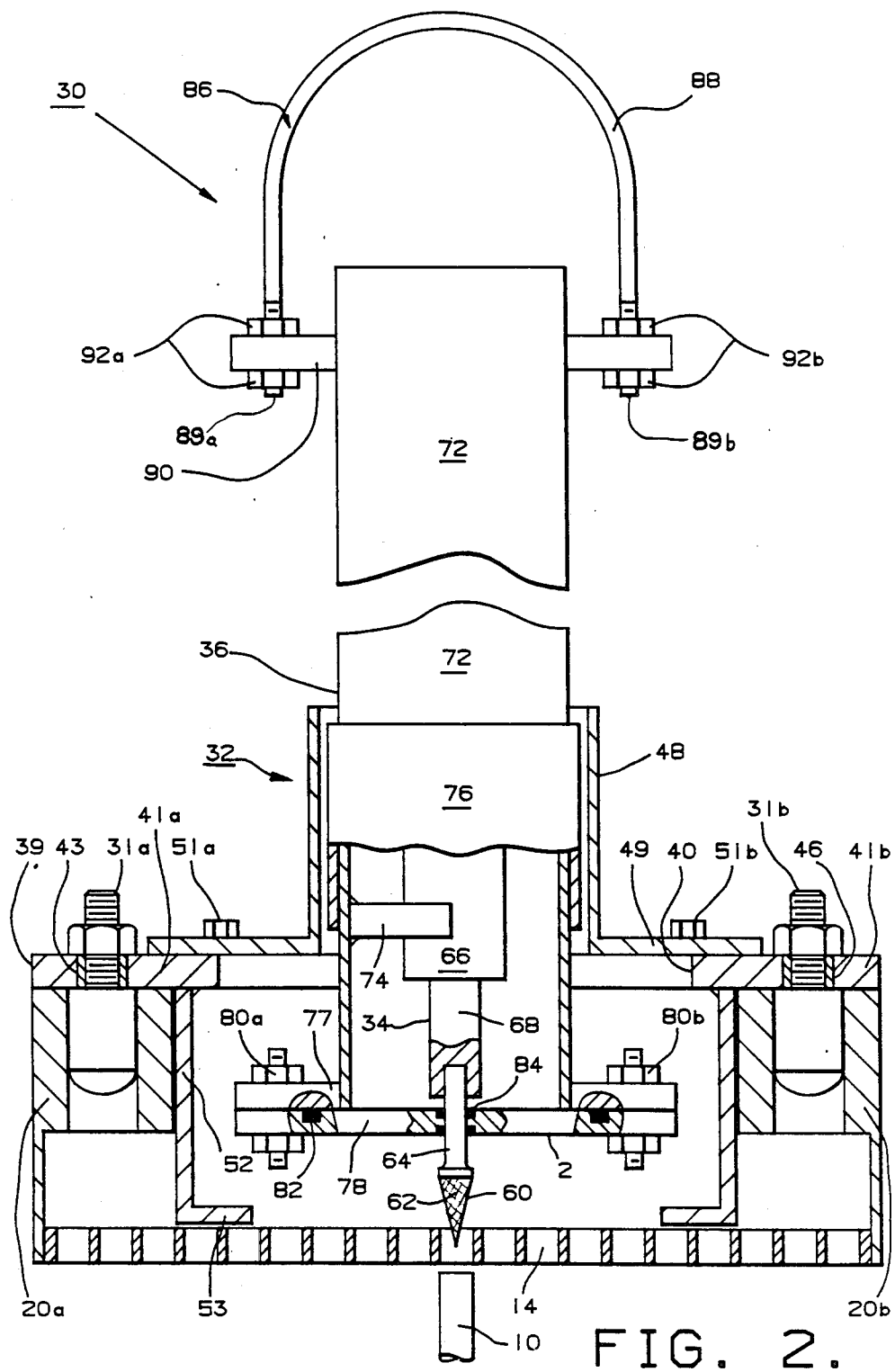
FIG. 2 is a partial cross-sectional side view of the housing fixture, grinding mechanism, and engagement assembly of the invention.
Figure 3B:
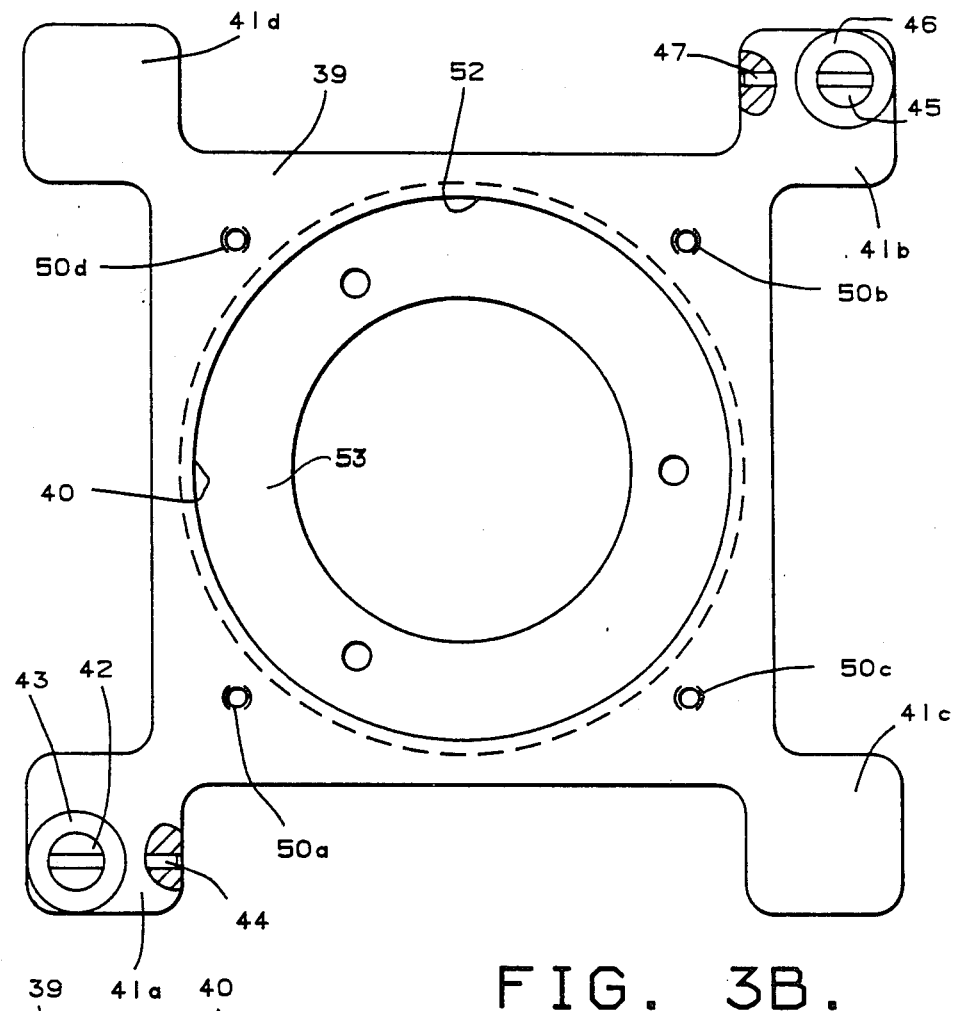
FIG. 3B is a partial cross-sectional plan view of this locking plate.
Figure 3A:
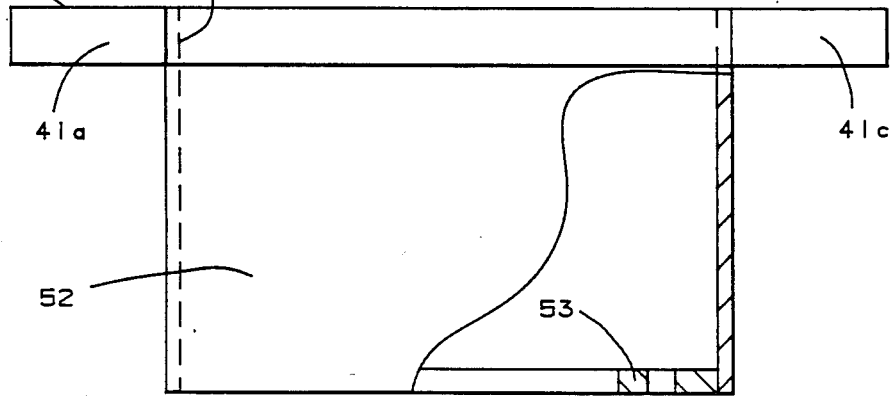
FIG. 3A is a partial cross-sectional side view of the locking plate of the housing fixture of the invention.

With reference now to FIGS. 2, 3A and 3B, the housing fixture 32 of the tooling system 30 includes a locking plate 39 that is generally square in shape. A circular opening 40 is present in the interior of the plate 39, while each of its four corners includes a foot 41a, 41b, 41c and 41d that is capable of overlying one of the support columns 20a, 20b, 20c and 20d of the top nozzle 5 when the housing fixture 32 is positioned thereover. The two catercornered feet 41a, 41b each include a hole 42 and 45 which is registrable with the previously discussed S-holes 26a, 26b of the catercornered columns 20a, 20b of the top nozzle 5. Brass sleeves 43 and 46 circumscribe each of these holes 42 and 45, respectively. Additionally, an anti-rotation pin 44 and 47 traverses each of the holes 42 and 45 and plugs 31a, 31b in order to prevent the plugs 31a, 31b from rotating when torque is applied to their expansion nuts. The precise function that each of the anti-rotation pins 44 and 47 plays with respect to the expandable plugs 31a, 31b is explained in greater detail hereinafter.

With reference now to FIGS. 1B, 2 and 3B, a cylindrical guide bushing 48 that terminates in a square flange 49 is mounted over the upper face of the locking plate 39. In the preferred embodiment, the circular opening defined by the interior of the bushing 48 is concentrically aligned with the circular opening 40 of the locking plate 39 (although this need not be the case in general). As is best seen in FIG. 3B, the upper face of the locking plate 39 includes four threaded bores 50a, 50b, 50c and 50d which are mutually registrable with bores present (but now shown) in the square flange 49 of the guide bushing 48. The bushing 48 is connected onto the locking plate 39 by means of bolts 51a, 51b, 51c, and 51d.

A cylindrical guide wall 52 extends from the bottom surface of the locking plate 39 as shown. As was the case with the previously described guide bushing 40a, the circular opening defined by the cylindrical guide wall 52 is preferably concentrically aligned with the circular opening 40 of the plate 39. The top edge of the guide wall 52 is welded to the bottom face of the locking plate 39, while the bottom edge of the wall 52 terminates in a circular stop flange 53. As is best seen with respect to FIG. 2, the round guide wall 52 helps to properly seat the housing fixture 32 within the interior of the box-like crown 18 of the top nozzle 5. Additionally, the circular stop flange 53 places a mechanical limit on the extent to which the tapered carbide burr 60 of the grinding mechanism 34 may be extended through the adapter plate 14 of the top nozzle 5.

With reference now to FIGS. 2 and 5, each of the expandable plugs 31a, 31b that extend down from the catercornered feet 41a, 41b is generally formed from a bolt 55 having a shallowly conical head 56 and a threaded shank 57, and a compressible urethane sleeve 58 that surrounds the bolt shank 57, and an expansion nut 59. A pinhole 57.1 traverses the upper portion of the shank 57 of each of the plugs 31a, 31b in order to receive the anti-rotation pins 44 and 47 which traverse the holes 42 and 45 in the feet 41a, 41b. As is best seen in FIG. 5, the urethane sleeve 58 that circumscribes the threaded shanks 57 of the bolts 55 of each of the expandable plugs 31a, 31b extends from the head 56 of each of the bolts to the bottom surface of the sections of the plate 39 defining the feet 41a, 41b. While not specifically visible in FIG. 3B, each of the locking pins 44 and 47 are received within elongated slots in the two catercornered feet 41a, 41b which are aligned with respect to the vertical. In its unexpanded form, the urethane sleeve 58 of each of the plugs 31a, 31b assumes a generally cylindrical profile which is no larger than the diameter of the head 56 of bolt 55. However, when a tightening torque is applied to nut 59, the head 56 is drawn toward the bottom surface of the foot 41a, and the sleeve 58 assumes the radially expanded, bulging profile indicated in phantom. As was previously indicated, the anti-rotation pins 44 and 47 ensure that the shank 57 of the bolt 55 will not rotate when a tightening torque is applied to nut 59. Additionally, since the slots which receive the pins 44 and 47 and feet 41a, 41b are elongated with respect to the vertical, the pins 44 and 47 are not unduly flexed or bent when a tightening torque is applied to nut 49. Finally, the shallow, conical profile of the bolt head 56 facilitates the insertion of the expandable plugs 31a, 31b into the S-holes 26a, 26b of the top nozzle 5.

With reference again to FIG. 2, the grinding mechanism 34 of the tooling system 30 includes a tapered carbide burr 60 having a conical grinding head 62 at one end and a shank 64 at the other end. In the preferred embodiment, the conical grinding head 62 is a compound diamond-cut grinding burr made from tungsten carbide that has a maximum diameter of one-half inch, such as the No. 2205 carbide burr available from the Falcon Tool Company located in Cleveland, Ohio. While burrs in shapes other than conical may also be used, a conical burr is preferred because of the way in which the tapered surface helps guide the grinding head 62 through the adapter plate 14 to create a smooth, circular bore. The grinding mechanism further includes an air motor 66 connected to the shank 64 of the burr 60 by means of a conventional coupling 68. In the preferred embodiment, the air motor 66 is a one-fourth horsepower, model No. 10 B 2008A air motor sold by the Dotco Company located in Lexington, South Carolina, and available through the aforementioned Falcon Tool Company located in Cleveland, Ohio. Such an air motor is capable of operating at a rotational speed of 25,000 rpm, which in turn advantageously results in the rapid production of a bore through the adapter plate 14 with the production of metallic particles which are generally no larger than about 20 mils across their largest diameter.

With reference again to FIG. 1B and FIG. 2, the engagement assembly 36 of the tooling system 30 includes an elongated, tubular mast 72 that is slidably movable within the cylindrical guide bushing 48 of the housing fixture 32. In its interior, the mast 72 includes a bracket 74 for securing the previously described air motor 66 in concentric relationship therewith. On its exterior, a brass sleeve 76 circumscribes that portion of the mast 72 which is surrounded by the guide bushing 48. In the preferred embodiment, the mast 72 is formed from a pipe of a relatively lightweight, anti-corrosive metal such as aluminum.

At its lower end, the tubular mast 72 terminates in an annular flange which is bolted to a brass guide plate 78 by means of stud and nut pairs 80a, 80b. In order to discourage water form flowing into the interior of the the mast 72 when the tooling system 30 is submerged in the water which normally covers fuel rod assemblies 1, a circular gasket 82 is sandwiched between the annular flange 77 and the guide plate 78. Finally, at its center, the guide plate 78 includes a high speed bearing 84 for rotatably mounting and guiding the tapered carbide burr 60 during a hole-grinding operation.

At its upper end, the mast 72 includes a lanyard 86 for facilitating the vertical movement of the carbide burr 60 with respect to the adapter plate 14 when the housing fixture 32 is mounted over a top nozzle 5. The lanyard 86 is formed from a U-shaped handle 88 whose ends 89a, 89b are threaded as indicated, and a support member 90 having bores (not shown) for receiving these threaded ends. Nuts 92a, 92b are used to secure the U-shape handle 88 to the support member 90.

Turning now to FIG. 4, the component gripper 38 of the tooling system 30 has a gripping actuator 96 at its upper end, a cylindrical sleeve 97 at its middle portion, and an expanding member 99 at its bottom end. The bottom of the expanding member 99 includes a tapered end 101 to facilitate the insertion of the component gripper 38 through a hole in the adapter plate 14. The expanding member 99 further includes a frustro-conical expanding surface 103 at its top for a purpose which will be explained presently. The expanding member 99 is connected at its upper end to a rod 105 which extends completely through the interior of the cylindrical sleeve 97. The connection between the expanding member 99 and the rod 105 is effected by means of a linking pin 107 as illustrated. Directly above the expanding member 99 is an expandable, cylindrical collet 109. This collet 109 may be formed from either a resilient material, such as urethane, or a split metallic sleeve formed from 17-4 PH stainless steel. In the latter case, the sleeve is rendered expandable by the provision of a plurality of interdigitating slots (not shown). In either case, the expandable collet 109 includes both an upper and a lower frustroconical recess 111, 113 which are adjacent to and complementary in shape with the previously mentioned frustroconical expanding surface 103 of the expanding member 99, and the conical end 115 of the sleeve 97, respectively.

The gripper actuator 96 includes another cylindrical sleeve 119 having a somewhat larger diameter than the previously described sleeve 97, and whose cylindrical interior is co-linear with the cylindrical interior of the smaller sleeve 97. The lower end of cylindrical sleeve 119 is welded onto an enlarged, annular shoulder 121 that forms the upper end of the smaller sleeve 97. The cylindrical interior 123 of sleeve 119 includes an actuator rod 125 that is connected to the upper end of the rod 105 by means of a pin 126, and whose upper end 127 is threaded as indicated. The threaded end 127 extends through a washer 129. An expanding nut 131 is threadedly engaged onto the threaded end 127 and into abutment with the washer 129 as indicated. Just below the threaded end 127 of the actuator rod 125, an anti-rotation pin 132 is provided in the wall of the cylindrical sleeve 119. This pin 132 is received within an elongated slot 133 which is aligned with the longitudinal axis of the actuator rod 125. In order to facilitate the manipulation of the component gripper 38, a lanyard 135 is provided at its top end. The lanyard 135 includes a U-shaped handle 136 having threaded ends 137 which extend through bores in a support member 138 that is welded to the cylindrical sleeve 119. Nuts 139 attach the U-shaped handle 136 to the support member 138 in a conventional manner.

When the expanding nut 131 of the component gripper 38 is tightened, the actuator rod 125 is drawn up toward the top end of the cylindrical sleeve 119. The anti-rotation pin 132 co-acts with the slot 133 to prevent any of the torque applied to the nut 131 from being dissipated in rotational movement of the actuator rod 125. When the actuator rod 125 is so withdrawn, the rod 105 is likewise withdrawn by virtue of the pin 126 which connects the two in tandem. This in turn causes the frustroconical expanding surface 103 and the conical end 115 of the sleeve 97 to engage the upper and lower frustroconical recesses 111, 113 of the expandable collet 109, thereby expanding it (as indicated in phantom). When the nut 131 is loosened, the collet 109 resumes its initial, unexpanded shape.

Figure 6:
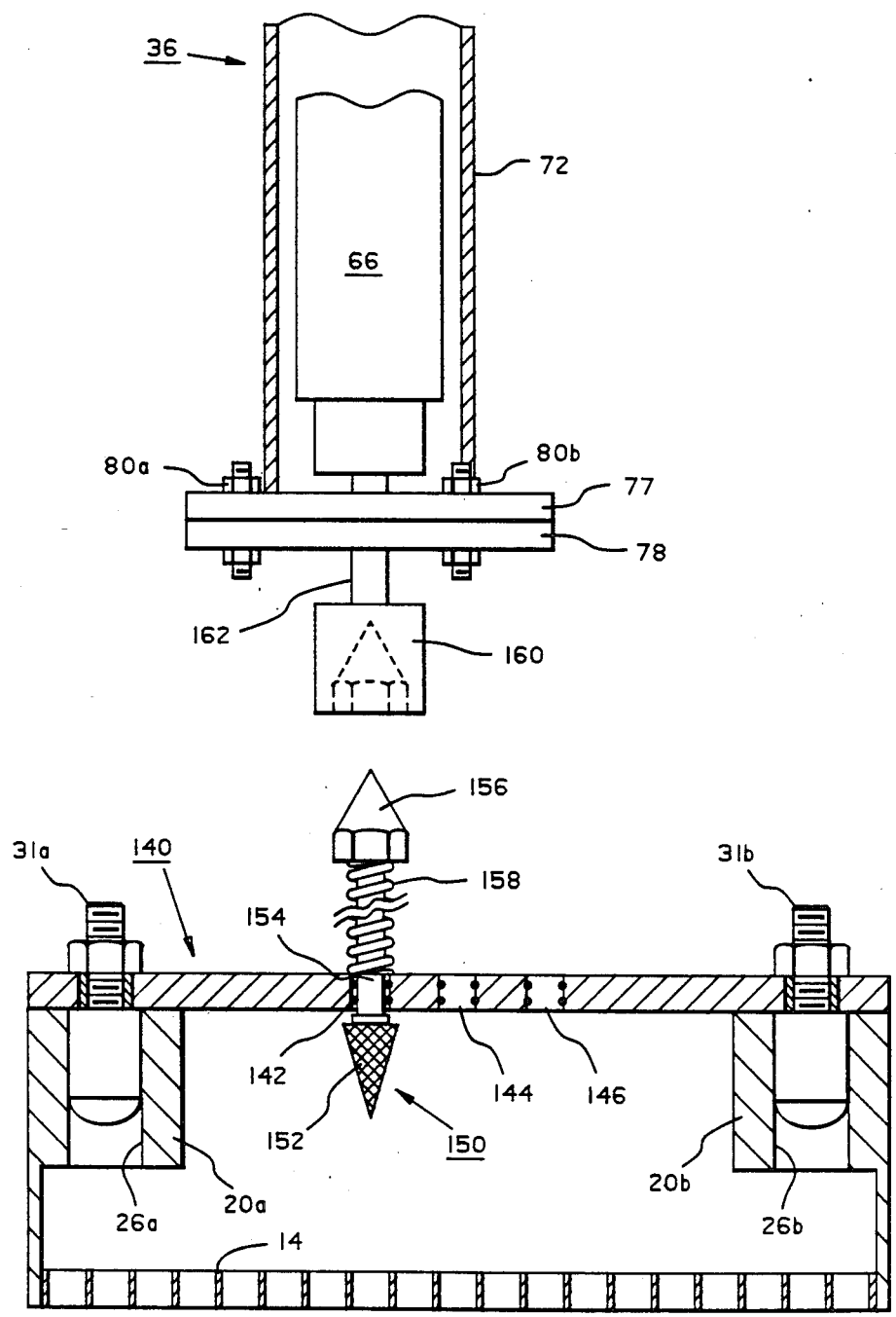
FIG. 6 is a partial cross-sectional side view of an alternative embodiment of the tooling system of the invention.

FIG. 6 illustrates an alternative embodiment of the invention that is capable of grinding a hole in the adapter plate 14 of a fuel rod assembly 1 at a selected location. In this alternative embodiment, clamping plate 39 is replaced with a modified plate 140 in which both the guide bushing 48 and the cylindrical guide wall 52 that extend it above and below the locking plate 39 are eliminated, as is the circular opening 40 of the plate 39 itself. In this modified plate 140, a plurality of high-speed bearings 142, 144 and 146 are provided in selected locations, each of which is capable of rotatably mounting a carbide burr 150 having a conical grinding head 152, and a shank 154. The carbide burr 150 is in all respects identical to the previously described carbide burr 60, with the exception of the provision of a hexagonal head 156 that is detachably connectable to the upper end of the shank 154 of the burr 150 by means of a set screw (not shown). Additionally, a helical compression spring 158 circumscribes the portion of the shank 154 that extends between the lower surface of the hexagonal head 156, and the upper surface of the modified locking plate 140. This spring 158 operates to retract the conical grinding head 152 from the adapter plate 14 after a hole is bore therethrough. Finally, a hexagonal socket 160 which is complementary in shape to the hexagonal head 156 is connected onto the end of the output shaft 162 of the air motor 66.

Now that the structures of both the preferred and alternate embodiments of the invention have been presented, a description of the preferred method of the invention will be given.

In the first step of the method of the invention, the fuel rod assembly 1 to be repaired is first moved into a fuel rod loading cask (not shown) or other maintenance facility where the assembly 1 may be completely submerged under a pool of radiation-absorbing water that preferably contains a neutron-absorbing chemical such as boric acid. Next, the control rod assembly 8 is removed from the frame of the fuel rod assembly by slidably pulling this rod assembly out through the top nozzle 5. Once the control rod assembly 8 is removed, the location of the component to be removed from the fuel rod assembly 1 is determined so that the exact location on the adapter plate 14 that is directly above this component might be ascertained. Such a determination may be made, for example, by means of remotely operated video camera (not shown).

Once the point on the adapter plate 14 that lies directly above the component to be removed has been ascertained, two options are available to the operator, depending upon which of the two embodiments of the invention he chooses to use. If the component happens to lie very close to the center of the adapter plate 14, then the operator may utilize the embodiment of the invention disclosed in FIGS. 1A through 5, making sure that the high-speed bearing 84 on the guide plate 78 of the positioning assembly 36 is located at a point which will overlie the desired point on the adapter plate 14 when the locking plate 39 is mounted over the upper end of the top nozzle 5 by means of the expandable plugs 31a, 31b.

On the other hand, if the point on the adapter plate 14 adjacent to the component to be removed is not located near the center of the plate 14, the operator may choose to utilize the embodiment illustrated in FIG. 6, making sure that the modified locking plate 140 is fabricated so that one of the bearings 142 overlies the desired point on the adapter plate 14.

In the next step of the method of the invention, a hole is ground through the adapter plate 14 at the point above the component to be removed by means of the previously described tapered carbide burrs 60 or 150, depending upon the embodiment utilized. If the embodiment illustrated in FIGS. 1A through 5 is utilized, the air motor 66 is actuated and brought up to a speed of approximately 25,000 rpm, and the conical grinding head 62 manually lowered by remote manipulation of the lanyard 86 of the engagement assembly 36 until the desired hole is produced in the plate 14. If the embodiment illustrated in FIG. 6 is utilized, the hexagonal socket 160 is manipulated over the hexagonal head 156 of the carbide burr 150 before the air motor 66 is activated. Motor 66 is then actuated, and a hole is produced in the plate 14 by manually reciprocating the mast 72.

In either instance, it should be noted that there are at least four advantages associated with the use of a conical, carbide burr in combination with a high-speed air motor to produce a hole in the adapter plate of a submerged fuel rod assembly 1. First, as has been mentioned previously, the metallic debris produced during such a grinding operation has a maximum diameter of approximately 20 mils which is too small to pose any significant risk that the resulting grindings and shavings will lodge in the spaces between the grids 11 and the fuel rods 9 and later damage them due to fretting. Secondly, the ambient water that surrounds such fuel rod assemblies 1 under such maintenance operations acts as a coolant, which lengthens the life of the carbide burrs 60 and 150. Thirdly, the neutron-absorbing boric acid that is almost always dissolved into the water in such maintenance pools acts as a lubricant which facilitates the grinding operation of the burrs 60 or 150 through the metallic adapter plate 14. Finally, the use of an air motor instead of an electric motor provides a drive system which is fully operational even if water is allowed to surround and penetrate the motor casing.

After the desired hole has been produced, the locking plates 39 or 140 are removed by loosening the nuts 59 on the expandable plugs 31a, 31b. The component gripper 38 is next lowered into the water surrounding the spent fuel assembly 1, and remotely manipulated through the hole by means of a lanyard 135. The expandable collet 109 is then inserted into the inner diameter of the component to be removed, and the nut 131 of the gripping actuator 96 is tightened so that the collet 109 expands and grips the component. The component is then removed from the fuel rod assembly by withdrawing it through the hole produced in the adapter plate 14 by the carbide burr 60 or 150.

What is claimed is:

1. An apparatus for removing a component from a fuel rod assembly having a top nozzle of the type that includes an adapter plate, comprising grinding means for grinding a hole through the adapter plate, wherein the grinding means produces grindings each having a maximum diameter of approximately 20 mils or less; a housing means detachably mountable over the top nozzle of the fuel rod assembly and operatively connected to the grinding means for positioning the grinding means over a selected point in the adapter plate, and means operatively connected to the grinding means for remotely engaging said grinding means into said adapter plate.

2. An apparatus for removing a component from a fuel rod assembly having a top nozzle that includes a crown and an adapter plate, comprising a grinding means for grinding a hole through the adapter plate, wherein the grinding means produces grindings each having a maximum diameter of approximately 20 mils or less; a housing means detachably mountable over the top nozzle of the fuel rod assembly and slidably connected to the grinding means for positioning the grinding means over a point in the adapter plate adjacent to the component; engagement means connected to said grinding means for moving said grinding means into grinding engagement with the adapter plate, and means for withdrawing the component through the hole in the adapter plate produced by the grinding means.

3. The apparatus 30 of claim 2, wherein said grinding means 34 includes a burr means 60 connected to a motor means 66.

4. The apparatus 30 of claim 3, wherein said motor means 66 is a high speed motor.

5. The apparatus 30 of claim 3, wherein said motor means 66 rotates said burr means 60 at a speed in excess of 10,000 rpm.

6. The apparatus 30 of claim 3, wherein said engagement means 36 includes a tubular mast member 72 which contains said motor means 66.

7. The apparatus 30 of claim 2, wherein said housing means 32 includes a guide bushing 48 for slidably mounting and guiding said engagement means 36.

8. The apparatus 30 of claim 2, wherein said engagement means 36 includes a tubular mast member 72.

9. The apparatus 30 of claim 2, wherein said housing means 32 includes at least two expandable plug means 31a, 31b that are receivable within and expandable against two pre-existing openings 26a, 26b, in the crown 18 of the top nozzle 5.

10. An apparatus for removing a component from a fuel rod assembly having a top nozzle that includes a crown and an adapter plate, comprising:
  (a) a grinding means including a burr means connected to a motor means for grinding an opening through the adapter plate sufficiently large to withdraw said component therethrough, wherein said grinding means produces grindings each having a maximum diameter of approximately 20 mils or less;
  (b) a housing means that is detachably connectable to the crown of the top nozzle and operatively connected to the grinding means for positioning the grinding means over a point on the adapter plate adjacent to said component;
  (c) engaging means connected to said grinding means for moving said burr means into engagement with said point on said adapter plate, and
  (d) gripping means insertable through the opening produced by said grinding means for gripping said component and withdrawing it through said opening.

11. The apparatus 30 of claim 10, wherein said housing means 32 includes a plurality of bearings at selected points thereon for rotatably mounting said burr 60 of said grinding means 34 at a selected point over said adapter plate 14.

12. The apparatus 30 of claim 10, wherein said housing means 32 includes at least two expandable plug means 31a, 31b that are receivable within and expandable against two pre-existing openings 26a, 26b in the crown 18 of the top nozzle 5.

13. The apparatus 30 of claim 10, wherein said motor means 66 operates at a speed greater than 15,000 rpm.

14. The apparatus 30 of claim 10, wherein said engagement means includes a tubular mast 72, and wherein said motor means 66 is mounted within said mast 72.

15. The apparatus 30 of claim 14, wherein said fuel rod assembly 1 is immersed in water, and said tubular mast 72 includes sealing means for preventing said motor means 66 from coming into contact with said water.

16. The apparatus 30 of claim 15, wherein said sealing means 6 includes a guideplate 78 sealingly mounted around one end of the tubular mast 72 having an aperture 84 for journaling the burr means 60 of the grinding means 34, and at least one gasket 82 circumscribing said aperture 84 for preventing water from entering the interior of the tubular mast 72.

17. The apparatus 30 of claim 10, wherein said gripping means 38 includes a radially expandable member 109 which may be remotely expanded.

18. The apparatus 30 of claim 10, wherein said motor means 66 is an air motor which operates at a speed greater than 15,000 rpm.

19. A tooling system 30 for remotely removing a component 10 captured in
a fuel rod assembly 1
having top and bottom nozzles
which are immersed in water, wherein said top nozzle 5 includes a plate 14 which overlies said component 10 and a crown that overlies said plate 14, characterized by:
  (a) a grinding means 34 including a burr means 60 connected to a motor means 66 for grinding an opening through said overlying plate 14 of a size sufficient to allow the withdrawal of said component 10 therethrough, wherein the maximum diameter of each grinding produced by the burr means 60 is approximately 20 mils;
  (b) a housing means 32 that is connected to the grinding means 34 for positioning the grinding means 34 over a point in the plate 14 adjacent to the component 10 to be removed, said housing means 32 including at least two expandable plugs 31a, 31b which are insertable within and expandable against preexisting holes in the crown 18 of the nozzle 5 for detachably connecting the housing means 32 to the nozzle 5;
  (c) engaging means 36 connected to the grinding means 34 for moving said burr means into grinding engagement with the overlying plate 14, including a tubular mast 72 which contains the motor means 66 of the grinding means 34, and
  (d) a gripping means 38 having a remotely operable, expandable member 109 which is insertable through the opening produced by the grinding means 34 for gripping the component 10 and withdrawing it through the opening.

20. The system 30 of claim 19, wherein said motor means 66 is an air motor that rotates said burr means 60 at a speed of about 20,000 rpm.

21. The system 30 of claim 19, wherein said burr means 60 is a cone-shaped carbide burr 62.

22. The system 30 of claim 19, wherein said tubular mast 72 includes sealing means formed by a guideplate 82 sealingly mounted around one end of the mast 72, and said guideplate 82 includes an aperture 84 for journaling the burr means 60 of the grinding means 34, and at least one gasket 82 circumscribing the aperture 84 for preventing water from flowing through the aperture 84 and into the interior of the tubular mast 72.

23. A tooling system 30 for remotely removing a component 10
within fuel rod assembly
having top and bottom nozzles 1 which are immersed in water, wherein said top nozzle 5 includes a crown 18, and a plate 14 which overlies said component 10, characterized by:
  (a) a grinding means 34 including a tapered carbide burr means 60 connected to an air motor 66 that rotates the burr means 60 at a speed of at least 20,000 rpm for grinding an opening through the overlying plate 14 of a size sufficient to allow the withdrawal of said component 10 therethrough while generating waste particles each of which is no larger, than about 20 mils in length;

(b) a housing means 32 that is connected to the grinding means 34 and is detachably connectable to the overlying plate 14 of the top nozzle 5, for positioning the tapered carbide burr means 60 over a point on the plate 14 that overlies the component 10 to be removed, wherein said housing means 32 includes at least two expandable plugs 31a, 31b which insertable within and expandable against pre-existing holes 26a, 26b in said crown 18 of said top nozzle 5, as well as a guide bushing 48;

(c) engaging means 36 including a tubular mast 72 slidably received in the circular guide bushing 48 for moving said burr means 60 into grinding engagement with the overlying plate 14, wherein said tubular mast 72 contains the motor means 66 of the grinding means 34, and (d) a gripping means 38 having a remotely operable expandable member 109 which is insertable through the opening produced by the grinding means 34 for gripping the component 10 and withdrawing it through the opening.

24. A tooling system for remotely removing a component 10 within fuel rod assembly having top and bottom nozzles that are immersed in water, wherein said top nozzle 5 includes a crown 18 at its top and an adapter plate 14 at its bottom that overlies the component 10 to be removed, characterized by:

(a) a grinding means 34 including a tapered carbide burr means 60 connectable to an air motor 66 that rotates the burr means 60 at a speed of at least 20,000 rpm for grinding an opening through the adapter plate 14 of a size sufficient to allow the withdrawal of said component 10 therethrough while generating grindings each of which is no larger than about 20 mils in length;

(b) a housing means 32 having a plurality of bearing means 142, 144 and 146, one of which rotatably mounts the burr means 60 at a point over the plate 14 that is adjacent to the component 10 to be removed when the housing means is mounted onto the crown 18 of the top nozzle 5;

(c) engaging means 36 including a tubular mast 72 that houses an air motor 66 that is connectable to the burr means 60 for engaging the burr means 60 into grinding contact with the plate 14, and (d) a gripping means 38 having a remotely operable expandable member 109 which is insertable through the opening produced by the grinding means 34 for gripping the component 10 and withdrawing it through the opening.

* * * * *